United States Patent Office 3,531,977
Patented Oct. 6, 1970

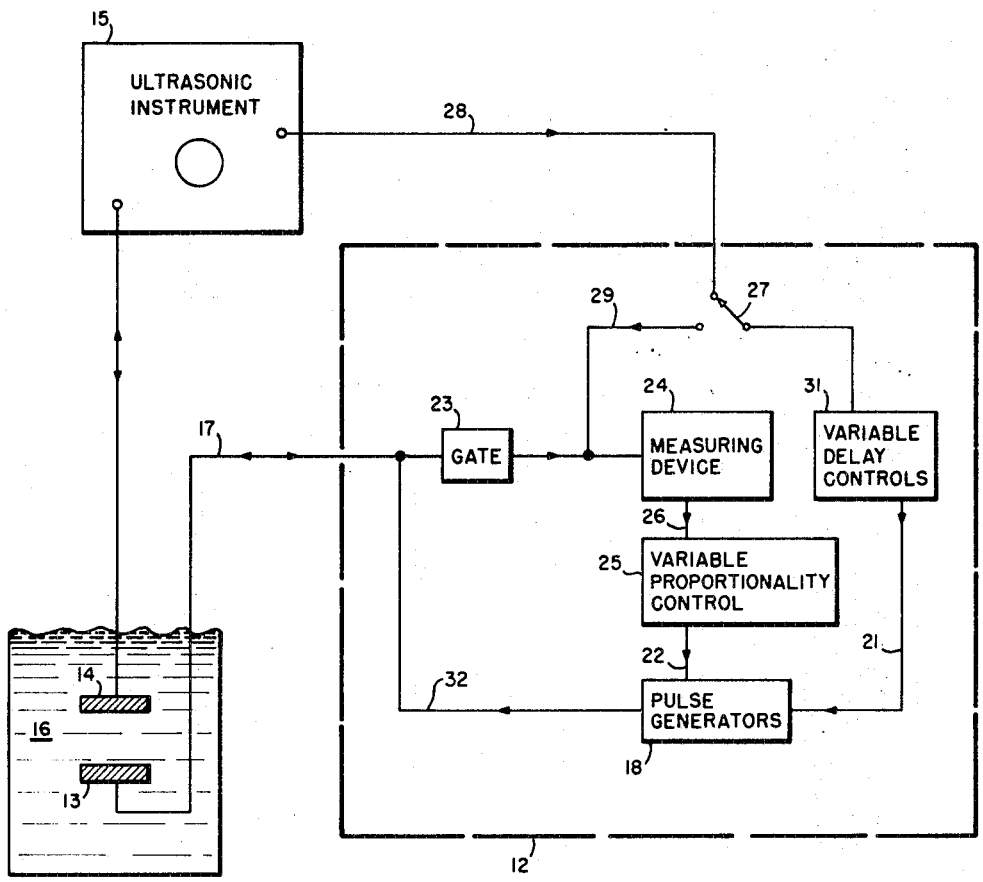

3,531,977
ELECTRONIC DEVICE FOR CALIBRATING AND REFERENCING ULTRASONIC INSTRUMENTS
Henry H. Chaskelis, Fairfax, and Stephen D. Hart, Alexandria, Va., assignors to the United States of America as represented by the Secretary of the Navy
Filed Oct. 16, 1968, Ser. No. 767,934
Int. Cl. G01d 21/00
U.S. Cl. 73—1                                8 Claims

ABSTRACT OF THE DISCLOSURE

An apparatus for calibrating and referencing ultrasonic test instruments by electronically simulating the presence of various characteristics in materials of various thicknesses. The apparatus receives an ultrasonic pulse from the instrument's transducer and generates a return pulse which is delayed in time by an amount proportional to the simulated thickness of the test material and having an amplitude representative of a simulated characteristic.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to ultrasonic test instruments for inspecting and detecting flaws in test materials, and more particularly to a new and improved system of calibrating the instrument to check its linearity of response and referencing such test instruments for a specific test to be conducted. Ultrasonic equipment is being used more and more frequently in an increasing variety of applications, however, the existing methods of calibrating/referencing such equipment are time consuming. In the past, ultrasonic equipment has been calibrated by operating the equipment on a set of test blocks which consist of a plurality of blocks manufactured from the material representative of that to be inspected, each block having a flat-bottomed hole drilled therein. The transducer is directed at the surface of the test block in such a way as to cause pulsed ultrasonic energy to penetrate the block and be reflected from the flat bottom of the hole. The return pulse is detected by the transducer and displayed upon the instrument. The amplitude or vertical deflection of the pulse displayed on the instrument will be representative of the size of the defect in the test block and the horizontal displacement of the pulse on the instrument scope will be representative of the time required for the ultrasonic wave to travel from the surface of the test block to the defect and return. By using blocks having holes of different diameters and/or depths from the surface of the blocks, the sensitivity of the ultrasonic instrument can be adjusted by those skilled in the art to suit the requirements of the inspection to be performed by the instrument. In other types of inspection tests which utilize a through-way, wherein a transmitting transducer sends ultrasonic energy completely through the material to be inspected to a receiving transducer, special test blocks are usually prepared to represent the type of material characteristic which must be detected.

Test blocks are expensive to manufacture and difficult to uniformly reproduce. A new set of test blocks must be prepared for any inspection that significantly departs from past established procedures, or for the testing of new materials the propagation properties of which differ from those of previously tested materials. When similar inspections are being performed at several facilities which are geographically separated, test blocks must be available at each facility so that each ultrasonic instrument may be calibrated and referenced. Since the identical reproduction of duplicate test blocks is extremely difficult, it is possible that two facilities may be using different standards while supposedly testing for the same characteristic. It is evident therefore that a need exists for a calibration and referencing system which is easily reproduced and by which the calibration steps may be quickly and accurately performed.

SUMMARY OF THE INVENTION

The present invention provides an improved calibration/reference system for ultrasonic instruments by employing an electronic reference block which electronically simulates the standard test blocks used in the past. The electronic reference block is a transponder which employs a standard transducer of known characteristics coupled to an electronic network. This network contains certain variable controls which may be set to simulate any given series of variables generally encountered in ultrasonic testing. Among these are flaw size, flaw depth, material attentuation, etc.

Under operating situations, the electronic test block controls are preset to return echoes as if they had been returned by a standard test block with a hole of known depth and size. The control that selects the amplitude of the return signal is a proportionality device which compensates for differences in input signal strength thereby producing a return echo which appears to be of proper size. The control that selects the apparent depth of flaw is merely a time delay control activated upon reception of the acoustic signal received by the standard transducer of the electronic test block. The electronic test block is also capable of returning a series of responses of various amplitude and apparent depths per each signal sensed by the standard transducer. In this manner, the ultrasonic equipment is calibrated for both amplitude and distance linearity under the actual dynamic testing conditions. It is therefore possible to calibrate a plurality of electronic reference blocks against a single set of standard test blocks which are maintained in a central control laboratory.

It is an object of this invention to provide an improved device for calibrating and referencing ultrasonic test instruments.

It is another object of the invention to provide a device which is uniformly and economically reproduced for calibrating and referencing ultrasonic test instruments.

Other objects, advantages and novel features of the invention will become apparent from the following detailed description of the invention when considered in conjunction with accompanying drawing wherein:

BRIEF DESCRIPTION OF THE DRAWING

The drawing, which illustrates the preferred embodiment of the invention, shows the electronic circuit in block diagram form within dashed line 12 coupled to a standard transducer 13 and shown in a typical test environment.

DESCRIPTION OF THE PREFERRED EMBODIMENT

Referring now to the drawing, the calibration device of this invention includes a standard transducer 13 and associated electronic circuitry shown within the dashed line 12. The properties of the standard transducer are known so that the electrical output of the transducer may be predicted for various ultrasonic energy levels which are received by the transducer. Suspended above the standard transducer is a test transducer 14 which is a part of the ultrasonic instrument 15 to be calibrated and referenced. Transducers 14 and 13 are shown as being immersed in a container of water or other suitable fluid to provide a coupling between the transducers so that, when transducer 14 produces an ultrasonic pulse in response to an electrical signal from the instrument 15, the ultrasonic pulse is received by the transducer 13 and translated into an electrical output signal in line 17.

The invention includes a pulse generator 18 for providing a return pulse to the standard transducer 13. The output of the pulse generator 18 is triggered by a synchronizing signal on line 21 and the amplitude of the return pulse is determined by the magnitude of the signal on line 22. The purpose of this return pulse is to provide an ultrasonic signal from the standard transducer 13 to the test transducer 14 representative of that returning from a standard test block having a flaw of predetermined size and being a predetermined distance below the surface of the test material. The two input signals to the pulse generator on lines 21 and 22 may both be derived from the output of transducer 13. This output is fed into a gate 23 and then into a measuring device 24 wherein the amplitude of the output signal of the standard transducer, which is a function of the transmitting capability of the ultrasonic instrument, is measured. Having measured the output of the standard transducer, this signal is fed into a variable proportionality control device 25 which may be manually adjusted so that the amplitude of its output signal on line 22 is a predetermined function of its input on line 26. The output of the variable proportionality control 25 is then provided as a control input to the pulse generator on line 22 to cause the pulse generator to produce a return pulse having an amplitude bearing a known relationship to the amplitude of the output signal of the standard transducer 13, that relationship being determined by the selected setting on the control unit 25.

The synchronizing signal on line 21 may be selected from one of two sources by means of a switch 27. When in the position shown, switch 27 connects line 21 of the electronic reference block with an output line 28 to a synchronizing signal output connection on the ultrasonic instrument. However, if the ultrasonic instrument does not include a synchronizing signal output connection, switch 27 may be moved to make contact with line 29 which then is coupled to the circuit through which the output signal from the standard transducer passes and this signal is used as the synchronizing signal to trigger the pulse generator. Coupled into the synchronizing signal line 21 ahead of the pulse generator is a variable delay 31 which may be adjusted to delay in time the return pulse by an amount equivalent to the time required for an ultrasonic pulse to travel a predetermined distance in the test material.

When using the present invention, the set of test blocks required for previous calibration techniques is replaced by the standard transducer 13 and the associated electronic circuit. The variable delay 31 is manually adjusted to delay the return pulse of the pulse generator by an amount representative of the travel time of an ultrasonic beam through an actual test block. The variable proportionality control 25 is adjusted to produce the proper ratio between the input voltage on line 26 to the output voltage on line 22 thereby simulating a flaw of predetermined size.

With these settings of control 25 and delay 31, the return pulse from the pulse generator to the standard transducer will be displayed by the ultrasonic instrument in the same manner as would be the return pulse from a reference block having a hole formed therein of a predetermined size and being located a predetermined distance below the surface of the block.

The ultrasonic instrument produces an ultrasonic pulse train at transducer 14 which is received at standard transducer 13 and translated into an electrical signal proportional to the strength of the received ultrasonic pulse. This signal is fed through a gate 23 and measured at 24. The gate 23 closes immediately after reception of the pulse from the standard transducer and remains closed until after the return pulse is sent out. After being measured, the signal is directed to the variable proportionality control 25 wherein the amplitude of the signal is modified by an amount equivalent to the effect produced by the simulated defect. The output of the control 25 is provided as an input to the pulse generator 18. The sychronizing signal may be derived either from the line 28 to the instrument or from line 29 to the transducer circuit and this synchronizing signal is processed through the variable delay 31 and provided as a triggering input to the pulse generator. This triggering input signal is delayed by an amount equivalent to the time required for an ultrasonic pulse to pass through an actual thickness of test block. Upon receipt of the triggering signal at the pulse generator, a return pulse is directed to the standard transducer by line 32 to a connection with line 17 adjacent gate 23, which was closed upon passage of the output signal from the standard transducer and which remains closed until passage of the return pulse. Upon receipt of the return pulse, standard transducer 13 produces an ultrasonic wave which is detected by transducer 14 and translated to an electrical signal which is displayed on the instrument 15. The vertical and horizontal deflection of the signal on the instrument's scope should coincide with the display expected from a standard test block which is simulated by the settings of the variable delay and the variable proportionality control. If this display does not coincide, one skilled in the art may adjust the instrument accordingly.

It will be apparent therefore that the present invention provides an electronic reference block wherein the settings of the variable delay 31 and variable proportionality control 25 may be calibrated against one standard set of test blocks maintained in a control laboratory and thereafter, any test block of the set may be simulated by selection of the corresponding settings on the delay and the proportionality control. The present invention therefore provides a reliable and accurate calibrating and referencing device which may be set to simulate nearly any conceivable test condition desired to be inspected. The apparatus of this invention is less expensive than sets of test blocks which are currently in use and this apparatus may be accurately duplicated with greater precision than obtainable by duplication of sets of test blocks.

It is recognized that various modifications and variations of this invention may be practiced by those skilled in the art, for example any suitable coupling fluid may be used between the test transducer and the standard transducer. Also the invention may be practiced by direct coupling of the test transducer to the standard transducer. Various types of transducers may be employed including electro-optic transducer arrangements. The invention may also be used to calibrate and reference ultrasonic instruments of the through-ray type wherein the instrument has first and second transducers which measure the effect upon an ultrasonic beam as it passes completely through the test material. In this situation, a standard transducer of this invention is also coupled to the second or receiving transducer of the ultrasonic instrument. This invention can also be used to calibrate/reference instruments used for shear wave testing. Additionally, the return pulse may be frequency modulated to simulate echoes received under conditions wherein the reflecting surface of a flaw may be perturbated either deliberately by auxiliary vibration sources or through vibrations occurring in normal test conditions. The return pulses may also be shaped in such a way as to cause an amplitude distribution of vibrations in the pulse which will be similar to the variations caused in actual testing by the shape of the reflecting surface such as a flaw or by frequency related amplitude losses in various media.

It is also within the scope of this invention to employ a pulse generator which is capable of producing a plurality of return pulses in response to a single ultrasonic pulse received by the standard transducer. In this embodiment, the amplitude of each pulse and the time delay between pulses in the multiple return pulse train may all be selectively controlled, thus enabling a one-step calibration procedure for time delay and amplitude linearity.

It is also possible to simulate attentuation in materials by suitably modifying the amplitude and shape of the returned pulse as a function of delay. It is also possible to insert a noise generator to simulate back-scatter signals from grain boundaries such as is encountered in brass, stainless steel, and other materials.

Other modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. Apparatus for calibrating and referencing ultrasonic instruments of the type which transmit ultrasonic energy and receive reflected pulses from an object, comprising:
   transducer means for receiving a transmitted pulse from said instruments and producing an output signal proportional to received ultrasonic energy, and for receiving an electrical return signal generated by said apparatus and transmitting an ultrasonic pulse corresponding to said return signal;
   pulse generator means coupled to said transducer means for producing said return signal to said transducer means;
   pulse generator control means coupled to said pulse generator and said transducer for modifying and delivering said output signal to said pulse generator for causing said return signal from said pulse generator to simulate a reflected ultrasonic signal;
   said control means including an amplitude control means for selectively varying the amplitude of said return signal in direct proportion to the amplitude of said transducer output signal.

2. The apparatus of claim 1 wherein said pulse generator control means further includes:
   a variable delay means for selectively delaying the return signal relative to said transducer output signal.

3. Apparatus for calibrating and referencing ultrasonic instruments of the type which transmit pulses of ultrasonic energy and receive reflected pulses from an object, comprising:
   transducer means for receiving a transmitted pulse and producing a signal proportional to the received ultrasonic energy,
   pulse generator means coupled to said transducer means and having first and second inputs and one output for generating return pulses to said transducer means to cause said transducer means to return a signal to said ultrasonic instrument, the first input controlling the magnitude of the return pulse and the second input triggering the output of the pulse generator means,
   control means coupled to said transducer means for modifying the output signal of the transducer by a preselected amount and providing the modified signal as the first input to the pulse generator,
   synchronizing circuit means coupled to the second input of said pulse generator to trigger the output of the pulse generator.

4. The apparatus of claim 3 wherein said synchronizing circuit includes:
   a variable delay means for selectively delaying in time the triggering input signal to the pulse generator.

5. The apparatus of claim 4 further comprising:
   a synchronizing signal selection switch coupled to said synchronizing circuit for selectively coupling said synchronizing circuit to either the output signal from the transducer or to a synchronizing signal output from the ultrasonic instrument.

6. The apparatus of claim 4 wherein:
   said pulse generator includes means for generating a plurality of return pulses in response to a single pulse received at said first input and means for independently adjusting the relative amplitudes of each pulse, and
   said variable delay means includes means for providing a plurality of triggering input signals to the pulse generator, the time between each triggering input signal being independently adjustable,
   whereby the ultrasonic instrument may be calibrated for both amplitude and distance linearity under actual dynamic testing conditions.

7. The apparatus of claim 3 wherein said control means includes:
   a variable proportionality control for selectively modifying the amplitude of the signal passing therethrough by a predetermined amount.

8. The apparatus of claim 3 further comprising:
   measuring means coupled to the output of said transducer for measuring the amplitude of the signal produced by said transducer.

References Cited

UNITED STATES PATENTS

| | | | |
|---|---|---|---|
| 2,944,621 | 7/1960 | Loofbourrow | 181—0.5 |
| 3,098,211 | 7/1963 | Gerber | 73—1 XR |
| 3,257,839 | 6/1966 | Vanhoesen et al. | 73—1 |
| 3,379,060 | 4/1968 | Pear | 181—0.5 XR |

LOUIS R. PRINCE, Primary Examiner

HARRY C. POST III, Assistant Examiner